(12) United States Patent
Han et al.

(10) Patent No.: US 6,853,428 B2
(45) Date of Patent: Feb. 8, 2005

(54) LIQUID CRYSTAL DISPLAY DEVICE AND METHOD OF FABRICATING THE SAME

(75) Inventors: Gil Jun Han, Chollanam-do (KR); Joo Hong Lee, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 83 days.

(21) Appl. No.: 10/285,446

(22) Filed: Nov. 1, 2002

(65) Prior Publication Data

US 2003/0123013 A1 Jul. 3, 2003

(30) Foreign Application Priority Data

Dec. 28, 2001 (KR) ........................................ P2001-87165

(51) Int. Cl.$^7$ ............................................ G02F 1/1343
(52) U.S. Cl. ....................................... 349/139; 349/152
(58) Field of Search ................................ 349/139, 149, 349/150, 151, 152

(56) References Cited

U.S. PATENT DOCUMENTS

2001/0020996 A1 * 9/2001 Ueda et al. .................. 349/149

FOREIGN PATENT DOCUMENTS

| JP | 04287022 A * | 10/1992 | G02F/1/1343 |
| KR | 1997-22408 | 5/1997 | |
| KR | 1998-26755 | 1/1998 | |

OTHER PUBLICATIONS

Bahadur, Liquid Crystals 1990, World Scientific, vol. 1, pp. 171–194.*

* cited by examiner

*Primary Examiner*—Kenneth Parker
*Assistant Examiner*—David Chung
(74) *Attorney, Agent, or Firm*—Morgan, Lewis & Bockius LLP

(57) ABSTRACT

A liquid crystal display device and a method of fabricating a liquid crystal display device having a pad including a first pad portion, a second pad portion, and a bent pad portion, the first pad portion being misaligned with the second pad portion, for making a uniform contact area and for maintaining a uniform output voltage even when misalignment occurs due to heat expansion are disclosed. The liquid crystal display device comprises a first substrate including a plurality of gate lines, a plurality of data lines, and at least a pad contacting one of the gate lines and the data lines. A second substrate is positioned adjacent to the first substrate and includes a color filter layer, and a liquid crystal material layer formed between the first and second substrates. The pad includes a first pad portion and a second pad portion such that the first and second portions are misaligned with each other.

15 Claims, 5 Drawing Sheets

LIQUID CRYSTAL DISPLAY DEVICE AND METHOD OF FABRICATING THE SAME

The present invention claims the benefit of Korean Patent Application No. P2001-87165 filed in Korea on Dec. 28, 2001, which is hereby incorporated by reference.

BACKGROUND OF THE INVENTION

1. Field of the Invention

The present invention relates to a liquid crystal display device and a method of fabricating a liquid crystal display device, and more particularly, to a liquid crystal display device and a method of fabricating a liquid crystal display device having a pad including a first pad portion, a second pad portion, and a bent pad portion, the first pad portion being misaligned with the second pad portion, for making a uniform contact area and for maintaining a uniform output voltage even when misalignment occurs due to heat expansion.

2. Discussion of the Related Art

The vast development of information also increases the demands for the development of display devices. Recently, many efforts have been made to study and develop various types of flat display panels, such as liquid crystal display devices (LCDs), plasma display panels (PDPs), electroluminescent displays (ELDs), and vacuum fluorescent displays (VFDs). Some of these types of flat display panels have been applied in and incorporated into a range of devices. For instance, LCDs have been commonly used as substitutions for cathode ray tubes (CRTs) in mobile image displays because of their high quality image, lightness, small thickness, compact size, and low power consumption. Although attempts have been made to incorporate LCDs into image devices for receiving broadcasting signals, such as televisions, and computer monitors. However, LCDs have not been as successfully incorporated into these image devices because the image quality has not been fully satisfactory. In order to implement a liquid crystal display device as a general display device, LCD development is dependent on realizing high image quality, high resolution, high brightness, and wide screen, while maintaining lightness, thin compactness, and low power consumption.

In general, a liquid crystal display device includes a liquid crystal panel for displaying an image and a driving unit for applying a driving signal to the liquid crystal panel. The liquid crystal panel includes first and second glass substrates bonded to each other with a predetermined space therebetween, and a liquid crystal material layer formed between the first and second glass substrates. The first glass substrate is commonly referred to as a thin film transistor (TFT) array substrate having a plurality of gate lines arranged along one direction at a predetermined interval from each other, a plurality of data lines arranged along a direction perpendicular to the gate lines at a predetermined interval from each other, a plurality of pixel electrodes formed in a matrix-arrangement within pixel areas defined by the gate and data lines crossing with each other, and a plurality of thin film transistors switched by signals of the gate lines to transfer signals of the data lines to the pixel electrodes. The second substrate is commonly referred to as a color filter substrate having a black matrix layer for cutting off light from a portion except in the pixel areas, an R/G/B color filter material layer for producing colored light, and a common electrode for producing an image. Spacers are used to separate the first and second substrates from each other with the predetermined space therebetween, and a sealant is used to bond the first and second substrates to each other.

The liquid crystal material layer may be formed in the liquid crystal panel by employing a liquid crystal injection process or a liquid crystal dropping process. The liquid crystal injection process includes coating a sealant on one substrate to form an injection inlet, bonding the substrate to a second substrate in a vacuum environment, and injecting liquid crystals therein through the injection inlet. The liquid crystal dropping process includes dropping liquid crystals on one substrate before bonding the two substrates to each other, and bonding a second substrate to the one substrate in a vacuum environment. Consequently, the driving unit is connected to the liquid crystal panel through a module mounting process. The module mounting process includes cleaning the liquid crystal panel, attaching a polarizing plate to the liquid crystal panel, and mounting a driving IC thereon. The diving IC generally is a tape carrier package (TCP) having tape automated bonding (TAB) integrated circuit (IC). An anisotropic conductive film (ACF) is first attached to a pad of the liquid crystal panel. While the TCP is aligned over the ACF, the TCP is bonded thereto by a pressurizing process. Bubbles generated from the pressurizing process (i.e, from a polarizing plate) are then removed. Thereafter, a TAB inspection, a resin coating process, a TAB attachment process, a welding process, an adjustment/test process, an assembly process, an aging process, and a final inspection are sequentially performed. Consequently, the TAB IC is connected directly to the liquid crystal panel to carry out signal and power supply on the TAB IC in accordance with a printed circuit board (PCB). Since the TAB IC is directly mounted on the liquid crystal panel, a thin LCD module can be mounted thereon, where a TCP output pad is connected to gate and data output pads of the liquid crystal panel using the ACF on the panel.

FIG. 1 illustrates a layout of a general liquid crystal display device, FIG. 2A illustrates a cross-sectional view of a general TAB package, and FIG. 2B illustrates an aligning layout of a liquid crystal panel pad and a TCP output pad according to a related art.

In FIG. 1, a first substrate 100, functioning as a thin film transistor array substrate and a second substrate 150, functioning as a color filter array substrate, are bonded to each other to form a liquid crystal panel having an active area 120. The first substrate 100 has a plurality of gate lines arranged along one direction at a predetermined interval from each other, a plurality of data lines arranged along a direction perpendicular to the gate lines at a predetermined interval from each other, a plurality of pixel electrodes formed in a matrix-arrangement within pixel areas defined by the gate and data lines crossing with each other, and a plurality of thin film transistors switched by signals of the gate lines to transfer signals of the data lines to the pixel electrodes. The gate and data lines have pads to connect a driving unit thereto. The second substrate 150 has a black matrix layer for cutting off light from a portion except the pixel areas, an R/G/B color filter material layer for producing colored light, and a common electrode for producing an image. Moreover, TCPs having driving ICs are bonded to the pads of the liquid crystal panel. For example, one TCP 101 having a gate driving IC 101a is connected to a printed circuit board 105, and the other TCP 102 having a data driving IC 102a is connected to another printed circuit board 106. The TCPs 101 and 102 are bonded to the gate and data pads 103 and 104 of the liquid crystal panel, respectively. Consequently, the gate driving IC 101a supplies the gate line with a driving voltage to sequentially turn ON/OFF the corresponding thin film transistor. The data driving IC 102a supplies the data line with a signal voltage to transfer a data voltage (i.e., video signal voltage) to the corresponding liquid crystal cell through the turned-ON thin film transistor.

In FIG. 2A, an anisotropic conductive film 115 is employed as a bonding material. The anisotropic conductive film 115 is coated on a pad area of the first substrate 100 of the liquid crystal panel 200. Polarizing plates 100a and 150a may be attached to the first and second substrates 100 and 150. Consequently, the TCP 101 or 102 having an output pad is aligned with the pads of the liquid crystal panel by placing over the anisotropic film 115. Heat is then applied to bond the TCP output pad and pads of the liquid crystal panel through a TAB bonding process. Heat may be applied using a heating tool 130, wherein buffer 132 may be additionally used for uniformly distributing the applied heat. The TCP 101 or 102 may be a part of a flat-TAB or bent-TAB package.

However, since the TCP is heated by the heating tool, heat expansion is generated in the output pad of the TCP. Such heat expansion can cause misalignment between the pads of the liquid crystal panel and the output pad of the TCP. More specifically, as illustrated in FIG. 2B, the gate or data pad 103 or 104 of the liquid crystal panel is rectangular. If the output pad 107 of the TCP is partially distorted by heat expansion, misalignment occurs by varying a contact area of a neighboring pad. Unfortunately, distortions in the output pad of the TCPs not only cause misalignment with the liquid crystal panel in the contact area, but also lead to a non-uniform output voltage to generate image failure.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device and method of fabricating a liquid crystal display device having an overlapped area between pads of a liquid crystal display panel and the output pad of a TCP even if the output pad is distorted by heat expansion or other reasons.

Another object of the present invention is to provide a liquid crystal display device having an uniform output voltage to prevent the image failure on a screen.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal device includes a first substrate including a plurality of gate lines, a plurality of data lines, and at least a pad contacting one of the gate lines and the data lines, a second substrate positioned adjacent to the first substrate and including a color filter layer, and a liquid crystal material layer formed between the first and second substrates, wherein the pad includes a first pad portion and a second pad portion such that the first and second portions are misaligned with each other.

In another aspect, the method for fabricating a liquid crystal display device, comprising the steps of: forming a plurality of gate lines on a first substrate, forming a plurality of data lines on the first substrate, forming a pad contacting one of the gate lines and the data lines on the first substrate, the pad includes a first pad portion and a second pad portion such that the first and second portions are misaligned with each other, forming a color filter layer on a second substrate, and forming a liquid crystal material layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
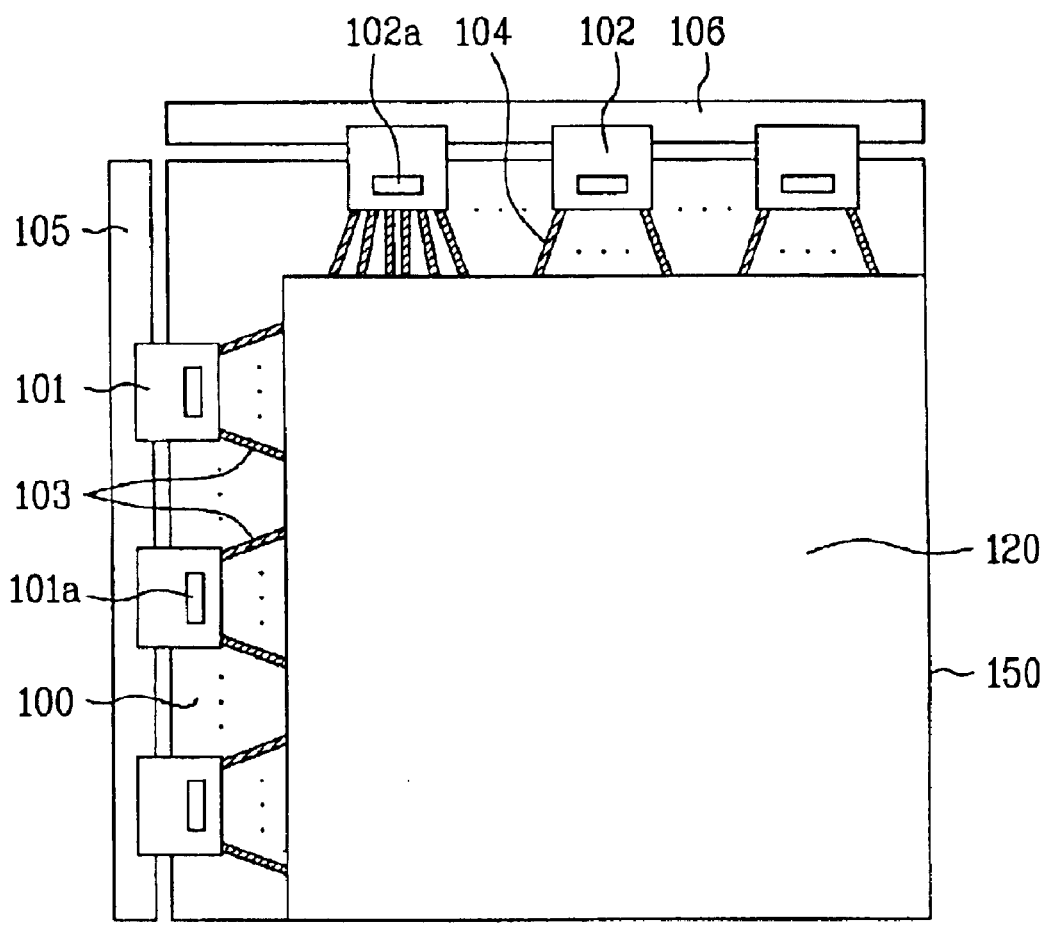
FIG. 1 illustrates a layout of a liquid crystal display device according to the related art.
Figure 2A:
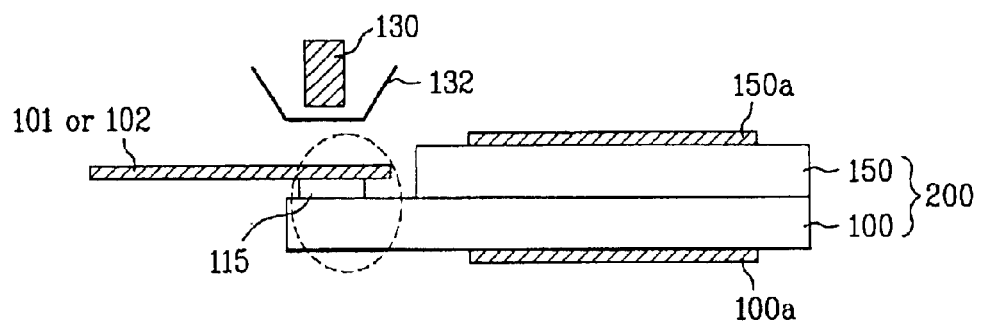
FIG. 2A illustrates a cross-sectional view of a TAB package according to the related art.
Figure 2B:
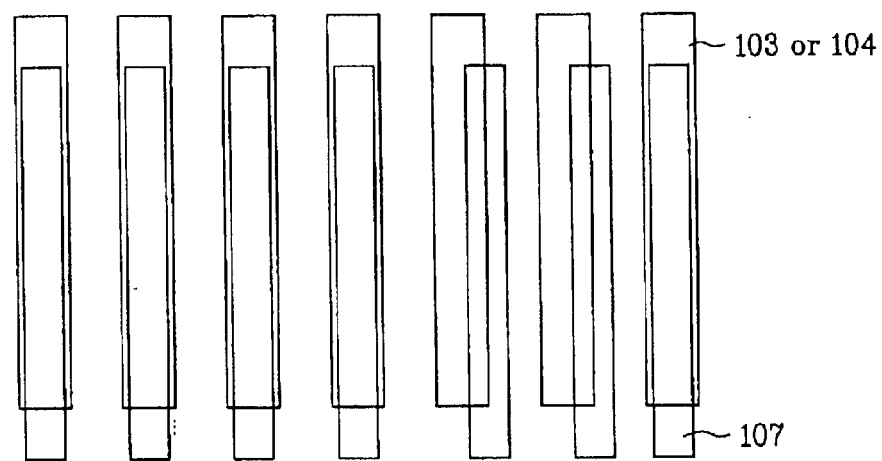
FIG. 2B illustrates an aligning layout of a liquid crystal panel pad and a TCP output pad according to the related art.
Figure 3:
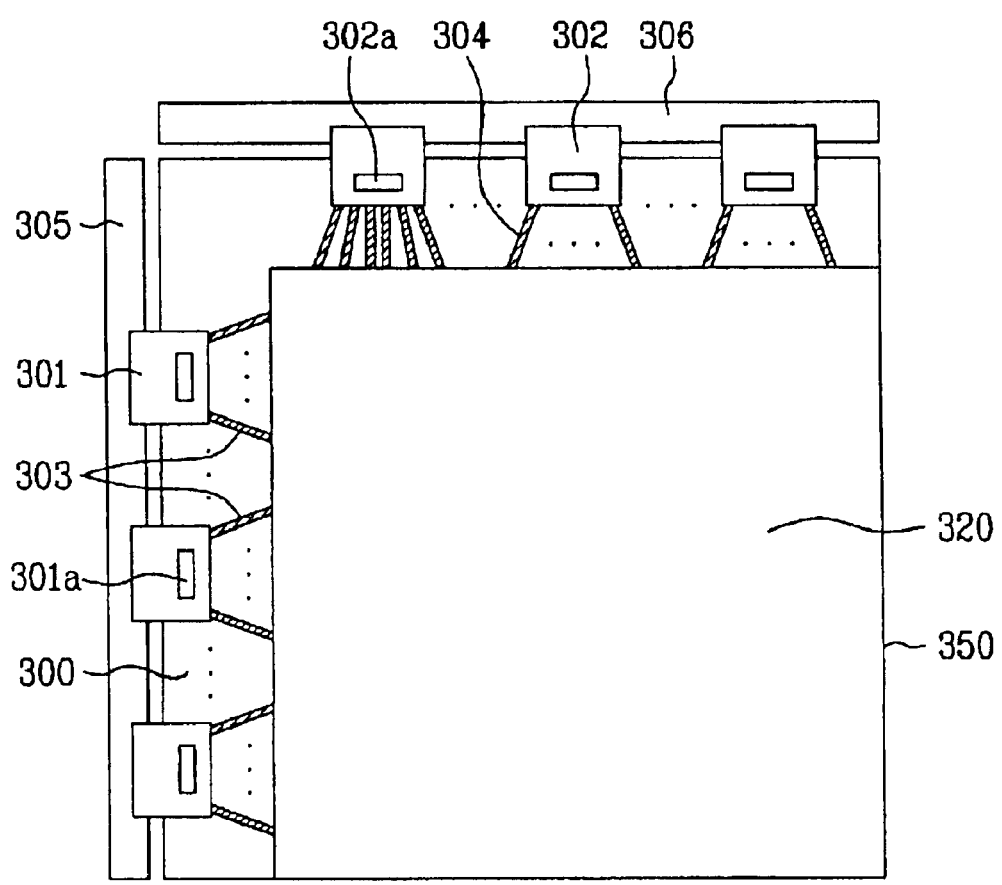
FIG. 3 illustrates a layout of an exemplary liquid crystal display device according to an embodiment of the present invention.

FIG. 3 illustrates a layout of an exemplary liquid crystal display device according to an embodiment of the present invention. In FIG. 3, the liquid crystal display device may include a first substrate 300 having gate and data lines (not shown), a second substrate 350, and an active area 320. A plurality of TCPs 301 and 302 having a plurality of driving ICs 301a and 302a may be bonded to pad areas of the liquid crystal panel. For example, the TCP 301 having the gate driving IC 301a may be connected to the PCB 305, and the TCP 302 having the data driving IC 302a may be connected to the PCB 306. In addition, the TCPs 301 and 302 may be bonded to gate and data pads 303 and 304 of the liquid crystal panel. Consequently, the gate driving IC 301a may supply the gate line with a driving voltage to sequentially turn ON/OFF the corresponding thin film transistor (not shown), and the data driving IC 302a may supply the data line with a signal voltage to transfer a data voltage (i.e., video signal voltage) to the corresponding liquid crystal cell (not shown) through the turned-ON thin film transistor.

Figure 4:
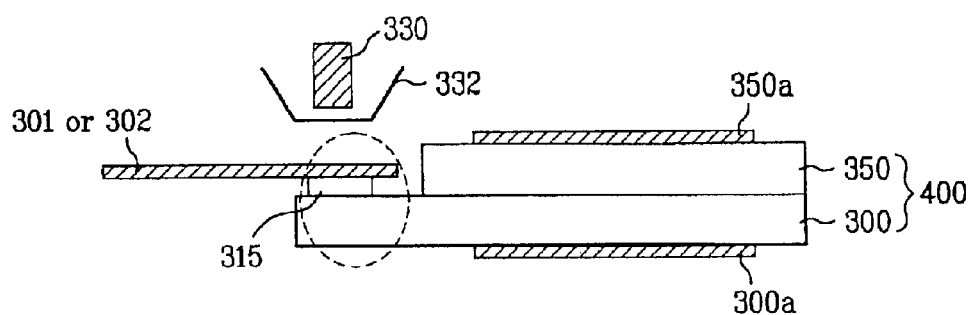
FIG. 4 illustrates a cross-sectional view of a pad area of an exemplary liquid crystal display device according to the present invention.

FIG. 4 illustrates a cross-sectional view of a pad area of an exemplary liquid crystal display device according to the present invention. A TAB bonding process for bonding a TAB package (i.e., output pads of the TCPs) to the pads of the liquid crystal panel is explained as follows. In FIG. 4, a liquid crystal panel 400 may include a first and second substrates 300 and 350 bonded to each other, and polarizing plates 300a and 350a may be attached to both sides of the liquid crystal panel 400. For example, an anisotropic conductive film 315 may be attached to a pad area of the first substrate 300. Subsequently, an output pad of a TCP 301 or 302 may be positioned over the anisotropic conductive film 315 such that the pads of the liquid crystal panel 400 and an output pad of the TCP 301 or 302 may be aligned and overlap each other. Once the pads of the liquid crystal panel 400 and the output pad of the TCP are aligned, they may be heated by a heating tool 330. Additionally, a buffer 332 may be used for uniformly distributing the applied heat. Consequently, the TCP 301 or 302 may be attached to the liquid crystal panel 400, wherein the TCP 301 or 302 may be a part of a flat-TAB or bent-TAB package.

Figure 5:
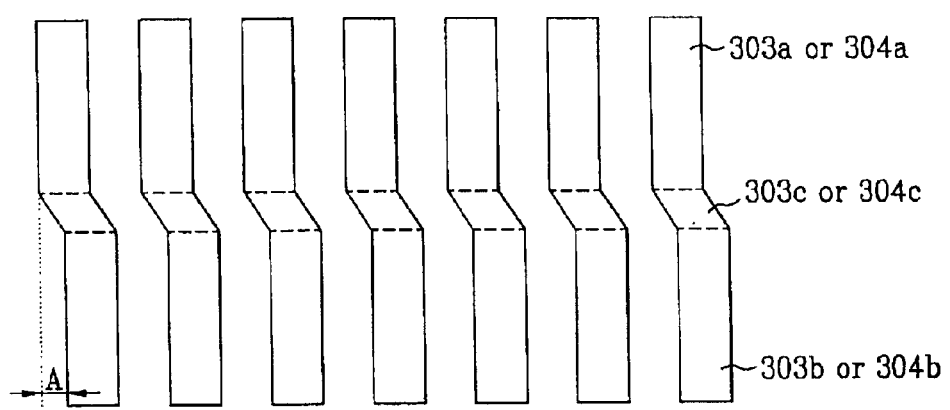
FIG. 5 illustrates a layout of a exemplary pad area of a liquid crystal panel according to the present invention.

FIG. 5 illustrates a layout of an exemplary pad area of a liquid crystal panel according to the present invention. In FIG. 5 gate and data pads 303 and 304 may be formed to have bent shapes. More specifically, the gate and data pads 303 and 304 may be formed to have polygonal shapes. For example, each of the gate and data pads 303 and 304 may include first and second horizontal portions 303a or 304a and 303b or 304b that are parallel with each other with an offset interval A. Each of the gate and data pads 303 and 304 may further include a bent portion 303c or 304c connecting the first and second horizontal portions 303a or 304a and 303b or 304b to each other via the offset interval A. The first and second horizontal portions 303a or 304a and 303b or 304b may have the same width.

Accordingly, each of the gate and data pads 303 and 304 may be formed to have first and second portions misaligned with each other, thereby ensuring an overlapped area with neighboring pads even if the neighboring pads are distorted by heat expansion. For example, if through a heating process, a portion of the output pad of a TCP is distorted and shifted away from the first horizontal portion 303a or 304a, the second horizontal portion 303b or 304b would compensate for such distortion and remain overlapped with the output pad of the TCP. Alternatively, if through a heating process, a portion of the output pad of a TCP is distorted and shifted away from the second horizontal portion 303b or 304b, the first horizontal portion 303a or 304a would compensate for such distortion and remain overlapped with the output pad of the TCP. Thus, the present invention maintains the same overlapped area with a neighboring pad or a negligible difference from that of the neighboring pad, even if a heat distortion occurs, thereby providing a uniform output voltage.

Figure 6:
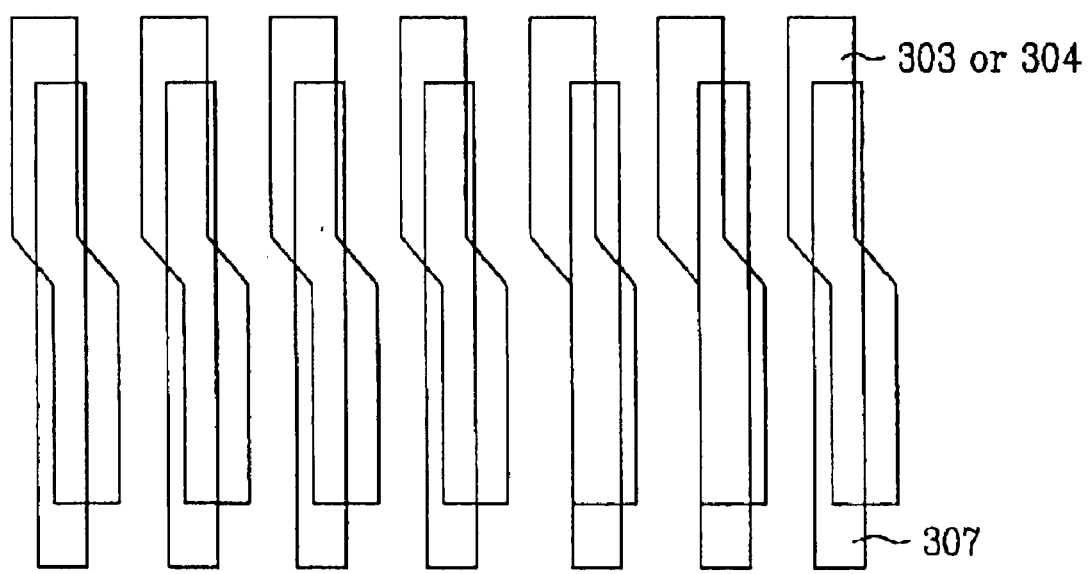
FIG. 6 illustrates an exemplary aligning layout of an crystal panel pad and a TCP output pad according to the present invention.

FIG. 6 illustrates an aligning layout of an exemplary liquid crystal panel pad and a TCP output pad according to the present invention. In FIG. 6, if an output pad 307 of the TCP 303 or 304 is partially distorted by heat expansion, the first and second horizontal portions reciprocally compensate the overlapped portions. Thus, the present invention provides the same overlapped area with a neighboring pad or a negligible difference from that of the neighboring pad, even if a heat distortion occurs. Moreover, an output voltage from each of the pad parts maintains to be uniform, thereby preventing image quality failure.

It will be apparent to those skilled in the art that various modifications and variations can be made in the liquid crystal display device and method of fabricating the liquid crystal display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate including a plurality of gate lines, a plurality of data lines, and at least a pad contacting one of the gate lines and the data lines;
   a second substrate positioned adjacent to the first substrate and including a color filter layer; and
   a liquid crystal material layer formed between the first and second substrates,
   wherein the pad includes a first pad portion and a second pad portion such that the first and second portions are misaligned but parallel with each other, and an offset interval created between the misaligned first and second portion is equal to or narrower than a width of the pad.

2. The device according to claim 1, wherein the pad further includes a bent pad portion connecting the first and second pad portions to each other with the offset interval.

3. The device according to claim 1, wherein a width of each of the first and second pad portions is substantially the same.

4. The device according to claim 1, further comprising a tape carrier package including an output pad, wherein the output pad overlaps with the pad.

5. The device according to claim 4, wherein at least one of the first and second pad portions overlap with a distorted portion of the output pad of the tape carrier package.

6. The device according to claim 1, further comprising a tape carrier package including an output pad, wherein the output pad overlaps with the pad.

7. A method of fabricating a liquid crystal display device, comprising the steps of:
   forming a plurality of gate lines on a first substrate;
   forming a plurality of data lines on the first substrate;
   forming a pad contacting one of the gate lines and the data lines on the first substrate, the pad includes a first pad portion and a second pad portion such that the first and second portions are misaligned but parallel with each other, and an offset interval created between the misaligned first and second portion is equal to or narrower than a width of the pad;
   forming a color filter layer on a second substrate; and
   forming a liquid crystal material layer between the first and second substrates.

8. The method according to claim 7, wherein the step of forming the pad further includes forming a bent pad portion connecting the first and second pad portions to each other with the offset interval.

9. The method according to claim 7, wherein each of the first and second pad portions is formed to have a width that is substantially the same.

10. The method according to claim 7, further comprising the step of overlapping of an output pad of a tape carrier package with the pad to form an overlapped portion.

11. The method according to claim 10, further comprising the step of bonding the output pad with the pad in the overlapped portion.

12. The method according to claim 11, wherein the step of bonding the output pad with the pad includes applying heat to the overlapped portion.

13. The method according to claim 12, wherein the step of bonding further includes placing a buffer on the overlapped portion.

14. The method according to claim 10, wherein the step of overlapping the tape carrier package with the pad area includes overlapping at least one of the first and second pad portions with a distorted portion of the output pad.

15. The method according to claim 7, further comprising the step of overlapping a tape carrier package including an output pad with the pad area to form an overlapped portion.

* * * * *